(12) United States Patent
Tawel et al.

(10) Patent No.: US 6,434,541 B1
(45) Date of Patent: Aug. 13, 2002

(54) AUTOMOTIVE ENGINE MISFIRE DETECTION SYSTEM INCLUDING A BIT-SERIAL BASED RECURRENT NEUROPROCESSOR

(75) Inventors: Raoul Tawel, Glendale; Nazeeh Aranki, Anaheim, both of CA (US); Lee A. Feldkamp, Plymouth, MI (US); Gintaras V. Puskorius, Novi, MI (US); Kenneth A. Marko, Ann Arbor, MI (US); John V. James, Walled Lake, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/284,843

(22) PCT Filed: Oct. 23, 1997

(86) PCT No.: PCT/US97/19141

§ 371 (c)(1),
(2), (4) Date: Apr. 21, 1999

(87) PCT Pub. No.: WO98/17989
PCT Pub. Date: Apr. 30, 1998

Related U.S. Application Data

(60) Provisional application No. 60/029,593, filed on Oct. 23, 1996.

(51) Int. Cl.$^7$ .............................................. G06F 15/18
(52) U.S. Cl. ........................................ 706/30; 706/43
(58) Field of Search ..................................... 706/30, 43

(56) References Cited

U.S. PATENT DOCUMENTS 5,943,659 A * 8/1999 Giles et al. ................... 706/2

* cited by examiner

*Primary Examiner*—George B. Davis
(74) *Attorney, Agent, or Firm*—Allan J. Lippa

(57) ABSTRACT

An engine diagnostic system includes a bit-serial based recurrent neuroprocessor for processing data from an internal combustion engine in order to diagnose misfires in real-time and reduces the number of neurons required to perform the task by time multiplexing groups of neurons from a candidate pool of neurons to achieve the successive hidden layers of the recurrent network topology.

20 Claims, 7 Drawing Sheets

AUTOMOTIVE ENGINE MISFIRE DETECTION SYSTEM INCLUDING A BIT-SERIAL BASED RECURRENT NEUROPROCESSOR

This application claims the benefit of Provisional application Ser. No. 60/029,593, filed Oct. 23, 1996.

TECHNICAL FIELD

This invention relates generally to detection of misfires in automotive internal combustion engines and, more particularly, to a bit-serial based recurrent neuroprocessor for processing data from an internal combustion engine in order to diagnose misfires in automotive engines in real-time.

BACKGROUND ART

Misfire diagnostics in internal combustion engines requires the detection and identification of improper combustion events in each firing cylinder. In order to utilize information from sensors now in production use, the diagnostic is based upon analysis of crankshaft dynamics. Misfire detection relies on computing the derivatives of crankshaft position sensor signals to determine short term average crankshaft accelerations several times each revolution. These accelerations are computed over rotational segments spanning the intervals between engine cylinder firings.

While analysis of crankshaft dynamics permits detection of engine misfire in many circumstances, the signal signatures of these events are obscured by complicated dynamics arising from torsional oscillations occurring in the crankshaft itself as a result of the excitation of its intrinsic normal modes. Since detection of misfires is based upon the principle that engine misfires cause a torque impulse to be absent, with a consequent torque or acceleration deficit, the detection of the deficit forms the basis of the misfire diagnostic. The diagnostic algorithms must detect the acceleration deficit in such a manner as to reliably detect the engine misfires, while recognizing the more frequently occurring normal combustion events. Analysis of the dynamics must result in failure detecting capabilities in excess of 95% of all failure events, with simultaneous identification of normal events as normal, with accuracies approaching 99.9%.

SUMMARY OF THE INVENTION

In accordance with the present invention, an engine diagnostic system is provided that includes a neuroprocessor capable of efficiently performing the required computations for detecting engine misfire and/or performing other diagnostic functions. The architecture and hardware is sufficiently flexible to be able to perform the misfire diagnostic task and still have the capability of performing other diagnostics or control functions in automotive systems such as idle speed control and air/fuel ratio control. This flexibility is achieved through the use of a high speed hardware realization of basic neural network blocks or units and time-multiplexing these blocks to form the specific neural architecture required for any designated task.

More specifically, the neuroprocessor achieves its compactness and cost effectiveness by employing a combination of bit-serial and bit-parallel techniques in the implementation of the neurons of the neuroprocessor and reduces the number of neurons required to perform the task by time multiplexing groups of neurons from a fixed pool of neurons to achieve the successive hidden layers of the recurrent network topology. For most recurrent neural network vehicular applications such as misfire detection, a candidate pool of sixteen silicon neurons is deemed to be sufficient. By time multiplexing, the sixteen neurons can be re-utilized on successive layers. This time-multiplexing of layers radically streamlines the VLSI architecture by significantly increasing hardware utilization through reuse of available resources.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
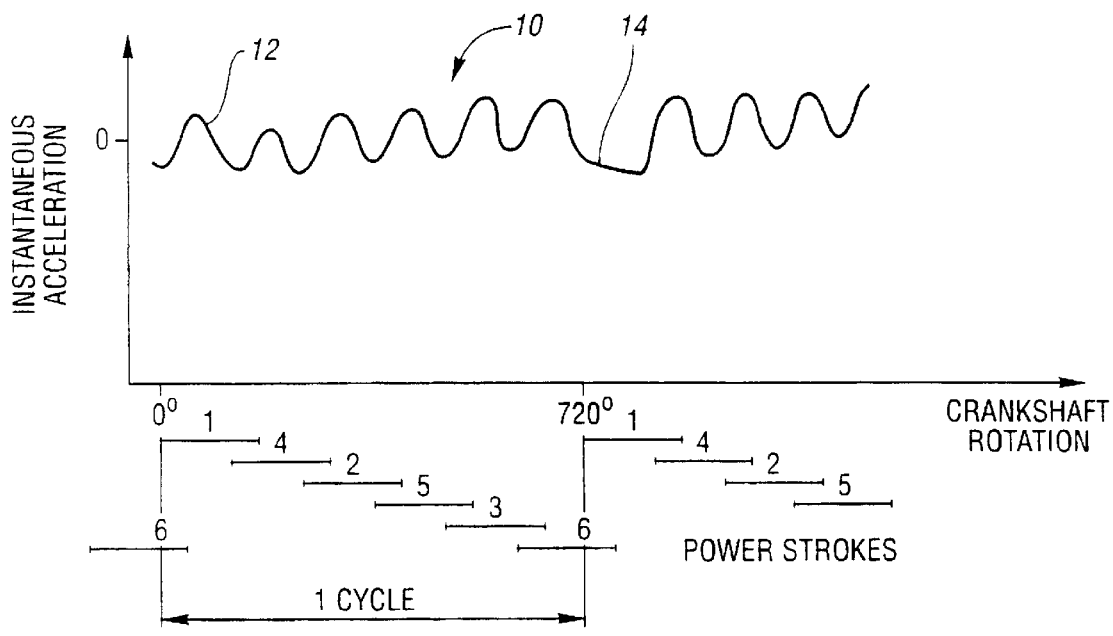
FIG. 1 is a plot showing instantaneous acceleration versus crankshaft rotation for normal and misfiring cylinders.

A typical 4-stroke combustion engine cycle includes the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 12 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 14.

Figure 2:
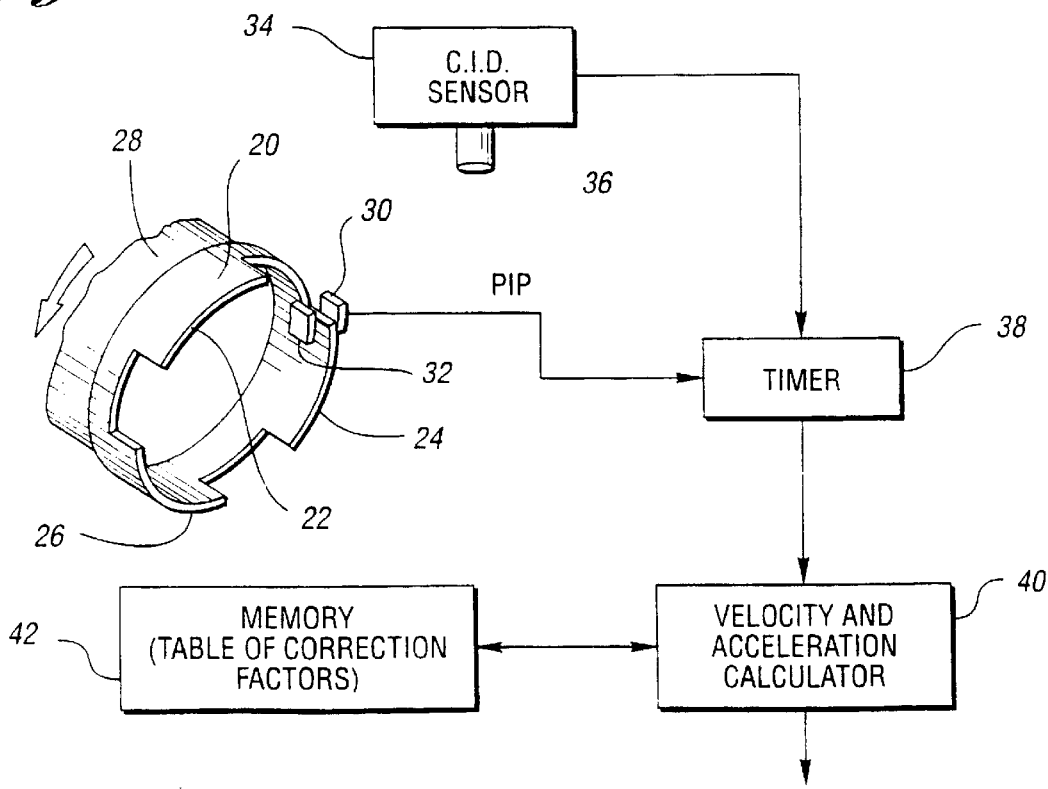
FIG. 2 is a schematic and block diagram showing measuring and calculating apparatus according to the present invention.

Crankshaft based misfire detectors have advantageously employed measured rotation intervals occurring at a frequency of about once per cylinder firing rather than attempting to measure instantaneous values as shown in FIG. 1. FIG. 2 shows an apparatus for measuring velocity and obtaining corrected acceleration values as described more fully in U.S. Pat. No. 5,531,108, which is incorporated herein by reference. An engine rotation position sensing system includes a rotor 20 having vanes 22, 24, and 26 which rotate with a crankshaft 28 (a 3-vane rotor from a 6-cylinder engine is shown in this example). Vanes 22–26 pass between a hall-effect sensor 30 and a permanent magnet 32 to generate a profile ignition pulse (PIP) signal as crankshaft 28 rotates. Vanes 22–26 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 34 is connected to a camshaft 36 for identifying which of the two cylinders is actually on its power stroke. Camshaft 36 rotates once for every two rotations of crankshaft 28. The resulting CID signal is preferably generated having a rising edge corresponding to the power stroke of cylinder No. 1. A timer 38 receives the PIP signal and the CID signal and measures elapsed time between predetermined engine position locations as determined by the PIP and CID signals. The elapsed time $\Delta T_i$ for each velocity measuring interval "i" is output from timer 38 to a velocity and acceleration calculator 40. Preferably, timer 38 and velocity and acceleration calculator 40 are implemented as part of a micro-controller with an associated memory 42 for storing correction factors, other data, and software instructions. An alternative position sensing apparatus may include a multi-toothed wheel mounted on the engine for rotation with the crankshaft, as disclosed in the aforementioned patent.

Figure 3:
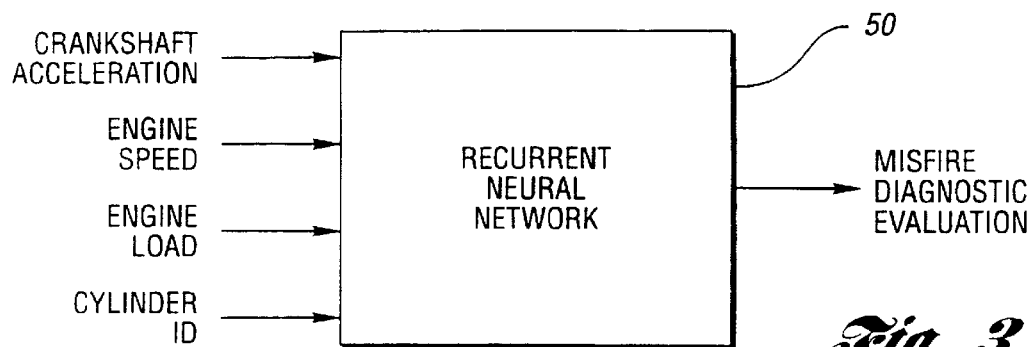
FIG. 3 is a block diagram showing the various inputs to a recurrent neural network for diagnosing engine misfires in accordance with the present invention.

Referring to FIG. 3, the misfire detection system of the present invention includes a recurrent neural network or neuroprocessor, generally designated 50, that has been trained off-line as a classification system to recognize engine misfires. The network 50 is a custom VLSI CMOS application specific integrated circuit (ASIC), that will be described more fully hereinafter. The four inputs to the network are engine speed (RPM), engine load (LOAD), crankshaft acceleration (ACCEL) and cylinder identification (CID). As previously indicated, CID enables the network to determine which cylinder is being observed. The output of the network 50 is a value that is positive or negative indicating the presence or absence of a misfire.

Figure 4:
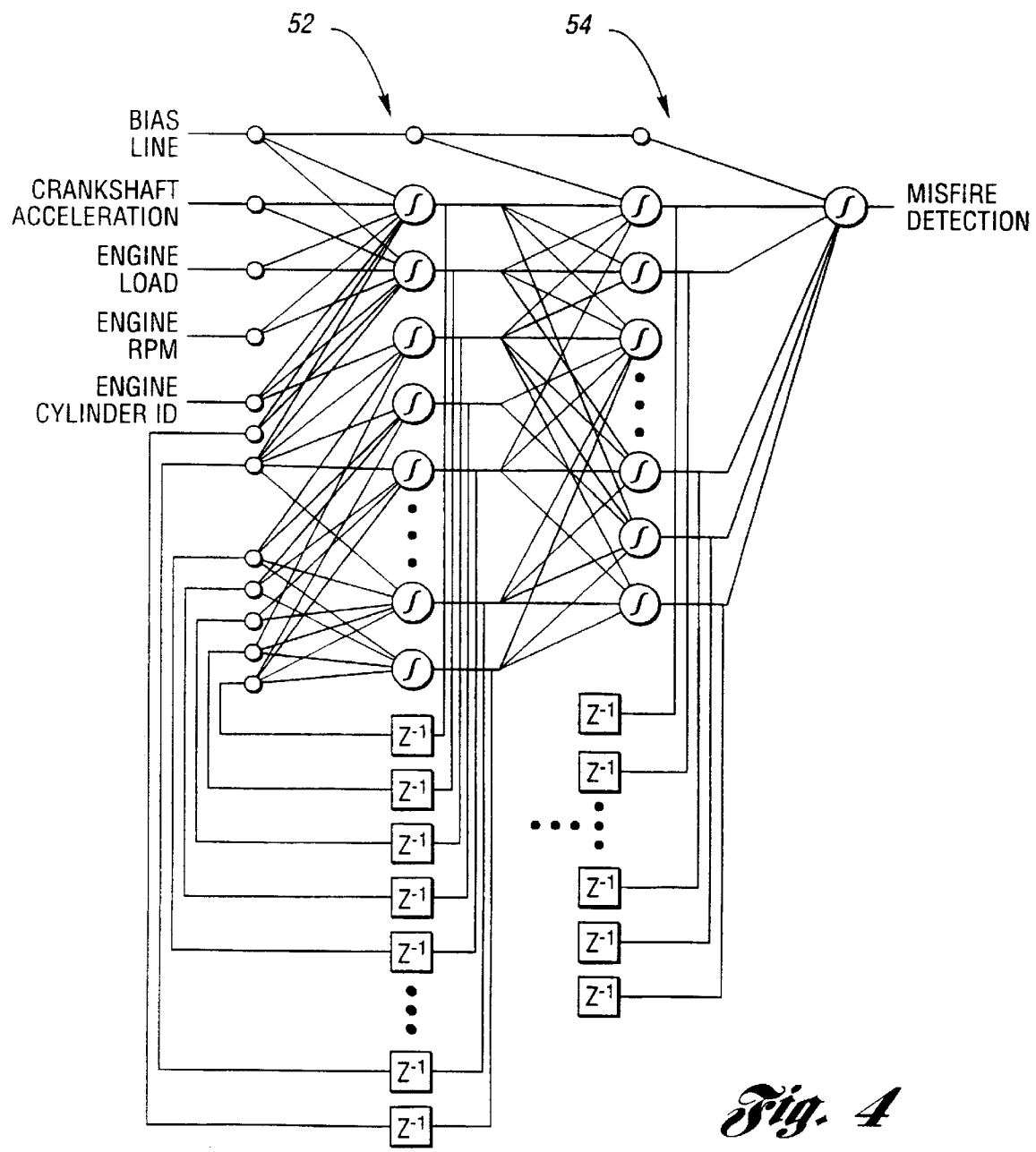
FIG. 4 shows the topology of a recurrent neural network of the present invention.

As shown in FIG. 4, the topology of the recurrent neural network 50 for the misfire application is a multilayer perceptron, with 4 inputs, a first hidden layer 52, a second hidden layer 54, and a single output node. All node activation functions are bipolar sigmoids. Each hidden layer contains a plurality of nodes and is completely recurrent, thereby providing internal feedback through unit time delays between each node as indicated by the $Z^{-1}$ blocks. In effect, the output of each node serves as input to each node of the same layer at the next time step.

The target output for the network is +1 or −1 according to whether a misfire was present or absent respectively, a specified number of time steps earlier, for example 8. This temporal offset, determined from preliminary training trials, permits the network to make use of information following the specific event it is to classify, because short lived disturbances cause effects which persist for an engine cycle.

The preferred network architecture for misfire detection is 4-15R-7R-1, i.e., 4 inputs, 2 fully recurrent hidden layers with 15 and 7 nodes, and a single output node. The network executes once per cylinder event (e.g., 8 times per engine cycle for an 8-cylinder engine). The inputs at time step "k" are the crankshaft acceleration (ACCEL), averaged over the last 90 degrees of crankshaft rotation, engine load (LOAD), computed from the mass flow of air, engine speed (RPM), and a cylinder identification signal (CID), e.g., 1 for cylinder 1, 0 otherwise, which allows the network to synchronize with the engine cylinder firing order. This network contains 469 weights; thus one execution of the network requires 469 multiply-accumulate operations (MAC) and 23 evaluations of the activation function, a computational load of 187,000 $MAC's^{-1}$.

The neural network is trained off-line with a standard digital computer and the trained weights are then stored in vehicle computer memory accessible to the neural chip hardware. In order to obtain optimum performance, the precision of the arithmetic in the off-line processors is matched to the bit precision of the hardware. The network is trained using derivatives computed by an extension of the well-known real time recurrent learning method (also known as "dynamic backpropagation") with weight updates based on the extended Kalman filter (EKF) procedure. The multi-stream training method is also employed. Multi-stream training procedures coordinate updates based jointly on data streams from different engine operating conditions. In the present case, 40 streams were used, each stream formed by randomly choosing a starting position in a file chosen randomly from the 25 files used. Periodically, new stream assignments are made, for example, after 250 instances from each stream have been processed. After such reassignment, recurrent node activations are initialized to zero and some number of instances are processed by the network without weight updates, in order to "prime" the network, i.e., to allow reasonable node activations to be formed. Each weight update step attempts to minimize jointly the current errors made by the network on each of the 40 streams. Because the EKF method is used, updates are not merely a simple average of the updates that would have been computed by the individual streams.

The database used for network training was acquired by operating a production vehicle over a wide range of operation, including engine speed-load combinations that would rarely be encountered in normal driving. Misfire events are deliberately introduced (typically by interrupting the spark) at both regular and irregular intervals. Misfire alters the torsional oscillation pattern for several subsequent time steps, so it is desirable to provide the network with a range of misfire intervals for all combinations of speed and load that correspond to positive engine torque. Though the data set used for training included more than 600,000 examples (one per cylinder event), it necessarily only approximates full coverage of the space of operating conditions and possible misfire patterns. Further discussion of training details may be found in co-pending application Ser. No. 08/744,258, filed Nov. 6, 1996, which is incorporated herein by reference.

Real-time signal processing requirements, as in the case or the engine misfire detection problem, typically require implementation in dedicated or algorithm specific VLSI hardware. Sample rate requirements for the broad class of automotive engine diagnostics can vary from low to moderate. This combination of low to moderate sample rates coupled with the a priori specification for cost effective hardware suggested a neuroprocessor based on a compact bit-serial computational architecture. Bit-serial implementations process one input bit at a time, and are therefore ideal for low to moderate speed applications and are compact and therefore cost-effective. In contrast, bit-parallel systems process all input bits of a sample in one clock cycle, and therefore require more silicon area, interconnections, and pin-outs.

Figure 5:
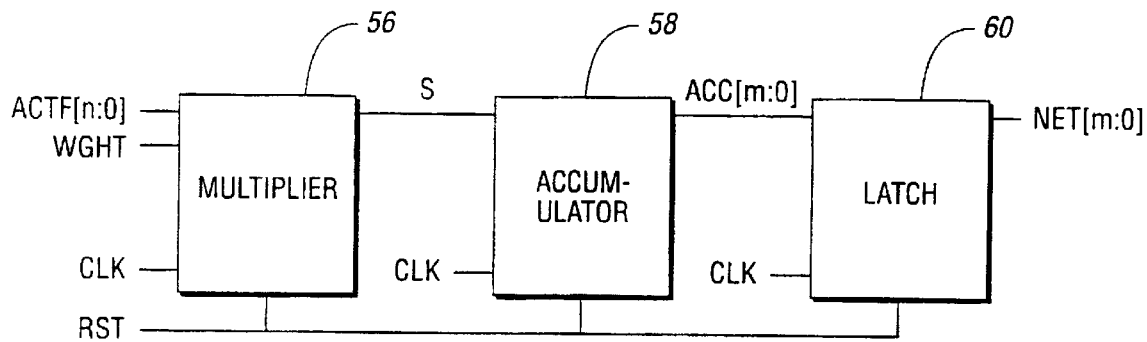
FIG. 5 is a block diagram of the bit-serial architecture of a neuron used in the recurrent neural network.

The bit-serial architecture of a neuron is shown in FIG. 5. Since the functionality of a neuron is to accumulate products formed from the multiplication of synaptic weights by corresponding stimulating activations, the VLSI silicon neuron closely models this functionality. In the silicon embodiment, a digital neuron consists of three functional building blocks. The blocks are pipelined and consist of a bit-serial multiplier 56, a bit-serial accumulator 58, and a bit-parallel output data latch 60. The input activations are provided to the multiplier in a bit-parallel fashion whereas the input synaptic weights are provided in a bit-serial fashion. The multiplier computes the product and makes it available to the accumulator in a bit-serial fashion. The accumulator 58 forms the products in a pipelined fashion as the data becomes available from the multiplier. The accumulated sum of the products is temporarily stored in the tri-state data latch 60.

Significant streamlining of the architecture, and hence better hardware utilization, is achieved by adopting a time multiplexed layers approach. Time multiplexing of layers refers to reusing the hardware used in calculating the activation of neurons in one layer for the calculation of neuron activations in another layer. Since neuro-computations are typically performed a layer at a time, multiplexing increases the utilization of hardware that would otherwise sit idle and leads to a direct reduction of the required silicon area. By reusing the circuitry dedicated to one layer during the evaluation of the next layer only enough hardware to accommodate the layer with the largest number of neurons, needs to be incorporated into the hardware chip. Other smaller layers can then reuse these portions of hardware during their execution.

Figure 6:
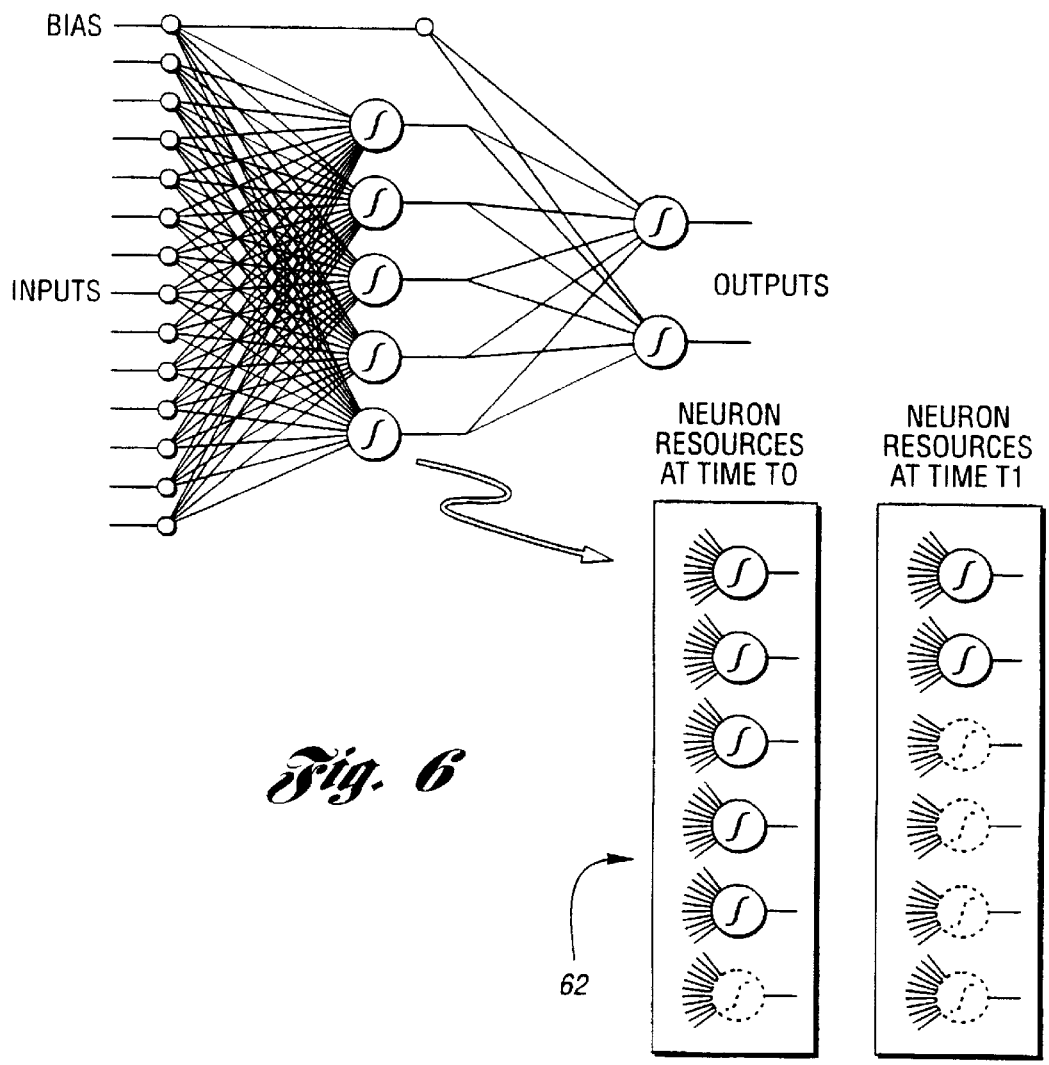
FIG. 6 depicts the time-multiplexed layer technique used in the present invention.

The multiplexing of layers is shown diagrammatically in FIG. 6. The time multiplexing or sequential processing issues become clearer once the flow of information in the neural network upon initiation of a computation is understood. If input sensory data are presented to the neural network's four inputs at time t=0, the only active computations being performed in the network are strictly limited to those neurons receiving stimuli from the input layer neurons, i.e., neurons lying uniquely in the first hidden layer. All other neurons remain totally inactive. If the computation time of the neuron is defined by T, then at time t=T, all neurons in the first hidden layer will have computed their activations. Neurons in the first hidden layer can now play a passive role and simply broadcast their activations to neurons in the next layer, i.e., the second hidden layer, in a similar fashion. At this time, the only active neurons are those in the second hidden layer. The computation proceeds a layer of neurons at a time until the output neuron's activation is finally calculated. Thus, computations in a neural network are strictly performed a layer at a time sequentially progressing through the hierarchy of layers that compose the network architecture. In the example of FIG. 6, the assigned neuron resources (5 of 16) for the hidden layer at time T0 is indicated at 62, and the assigned neuron resources (2 of 16) for the output layer at time T1 is indicated at 64. It will be understood that with respect to the misfire application shown in FIG. 4, there will be three multiplexing time periods T0–T2 for the two hidden layers 52 and 54 and the output layer.

As discussed previously, the basic element in neurocomputation is the neuron—which is a simple processing element. Neurons can be interconnected in various topologies by means of synaptic weights. Typically, neurons are organized into computational layers. Though arbitrarily complex network architectures can be constructed with these layers—architectures with multiple levels of hierarchy and interconnectivity—practical applications intimately link the neural network structure to its proposed functional use. The simplest form of nontrivial network is the multilayer perceptron shown in FIG. 4. The perceptron has an input layer of source nodes, any number of intermediate hidden layers, and a final layer of output neurons. The output signals of the neurons in the final layer of the network together constitute the overall response to the activation pattern supplied to the source nodes on the input layer.

Let the neurons be indexed by the subscript j. Then the total input, $x_j$ to neuron j, is a linear function of the outputs, $y_i$, of all the neurons that are connected to neuron j and of the weights $w_{ij}$ on these connections, i.e., $$x_j = \sum_i y_i w_{ij} \qquad (1)$$

Neurons are usually provided with an additional stimuli in the form of a bias which has a value of 1, by introducing an extra input to each unit. The weights on this extra unit are called the bias weights and are equivalent to a threshold. Neurons have real-valued outputs, $y_j$, which are a nonlinear function of their inputs. The exact form of this equation can vary depending on the application at hand. The activation function used in this VLSI architecture, the bipolar sigmoid, is given in equation (2).

$$y_j = -1 + \frac{2}{1+e^{-x_j}} \qquad (2)$$

Figures 7, 8:
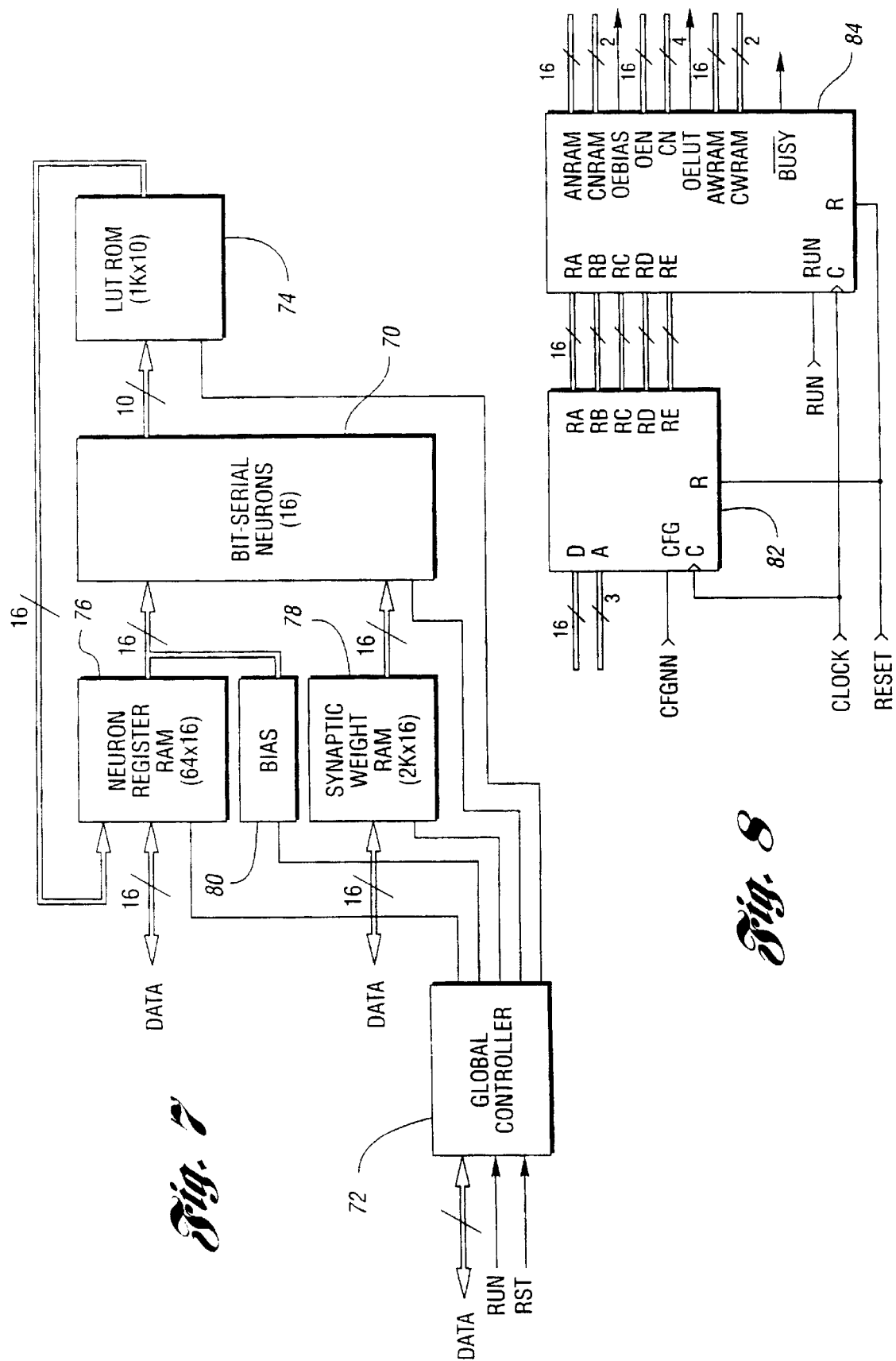
FIG. 7 is a block diagram of the neuroprocessor.
FIG. 8 is a block diagram of the global controller of the neuroprocessor.

Referring now to FIGS. 7 and 8, the architecture of the single chip stand-alone neuroprocessor 50 is shown. The chip was designed with the goal of minimizing the size of the neuroprocessor while maintaining the computational accuracy required for automotive diagnostic and control applications. The neuroprocessor architecture comprises a sixteen neuron module 70, a global controller 72, a sigmoid activation ROM look-up-table 74, neuron state RAM registers 76, and synaptic weight RAM registers 78. The controller 72 is shown in greater detail in FIG. 8. The sixteen neurons perform the neuronal multiply and accumulate operations. They receive as input the synaptic weights and activations from input nodes or from neurons on a previous layer in a bit serial-parallel fashion, and output the accumulated sum of partial products as given by equation (2). Because of the computational nature of neural networks—where information is sequentially computed a layer at a time—only enough neurons need be physically implemented in actual silicon as are required by the largest layer.

For specific recurrent neural network applications (e.g., misfire, idle speed control), a candidate pool of sixteen silicon neurons is sufficient. As previously stated, time multiplexing of layers permits the sixteen neurons to be re-utilized on successive layers. This time-multiplexing of layers radically streamlines the architecture by significantly increasing hardware utilization through reuse of available resources.

The global controller 72 enables the neurochip to execute its required task of generating necessary control logic as well as orchestrating data movement in the chip. When there are no computations being performed, the global controller remains in the idle state, signalling its availability by having the active low $\overline{\text{BUSY}}$ flag set high. When a RUN command is issued, the global controller is in charge of providing control signals to the sixteen on-chip neurons, the RAM and the ROM in order to proceed with the desired neurocomputation. Input activations are read out of the 64×16 Neuron State RAM 76, synaptic weights are read out of the 2K×16 Synaptic Weight RAM 78, and both are propagated to the bank of 16 neurons 70. The global controller not only keeps track of intra-layer operations, but inter-layer operations as well. Upon completion of a forward pass through the network architecture, the global controller asserts the $\overline{BUSY}$ flag and returns to the idle state.

With reference to FIG. 8, the global controller is made up of a configuration controller 82, and a run-time controller 84. Configuration of the hardware is performed by the configuration controller and requires the loading of five 16-bit registers that together explicitly define the topology of the recurrent neural network architecture.

The configuration controller 82 accepts as input, 16-bit data on bus D, a 3-bit address on bus A, a configuration control signal CFG, a clock C, and a global reset signal R. All signals feeding into the configuration controller are externally accessible. The 3-bit address bus internally selects one-of-five 16 bit configuration registers as the destination of the 16-bit data source D. By strobing the CFG control line, data can be synchronously loaded into any of the five architecture registers RA–RE. From an implementation perspective, the first four registers, registers RA–RD, uniquely define the topology of each layer in the neural network architecture. Thus, with this architecture there can be at most 4 layers in any recurrent neural network application—i.e., an input layer, an output layer, and two hidden layers. The 16-bit registers RA through RD each contain layer specific bit-fields (such as the number of neurons in the current layer and the number of recurrent connections within the layer) that collectively define the neural topology. Register RE defines the number of non-input layers in the neural network topology and since the number of layers is restricted to 4, only the lowest 2-bits are of significance. Once the five configuration registers are loaded, a unique network topology is defined, and the global controller can proceed to the run-time mode.

Once the configuration registers are loaded, control is passed to the run-time controller 84. At this stage, 2's complement binary coded data representing the engine sensor input quantities that need to be processed by the neural network are loaded into the neuron state RAM module 76 at appropriate memory locations. The module 84 remains in the idle mode for as long as the RUN line remains low. The low to high transition on the RUN line immediately resets the $\overline{BUSY}$ flag and initiates the execution of a single forward pass of the control hierarchy using the registers RA through RE as a template that defines the network's topology. The $\overline{BUSY}$ flag remains low until the neural network has completed the neurocomputation. It subsequently returns high after the contents of the output layer of the neural network have been placed back into appropriate memory locations of the neuron state RAM module 76. Once the $\overline{BUSY}$ flag goes high, the contents of the neuron state RAM module are made available to the external world, and can be retrieved by the appropriate toggling of the RAM control lines. In this fashion, the output of the network can be read out and fresh inputs can be loaded into the hardware. The neuron state RAM module 76 is a single port RAM module, so once the neural network begins computations, the RAM module is inaccessible.

Figure 9:
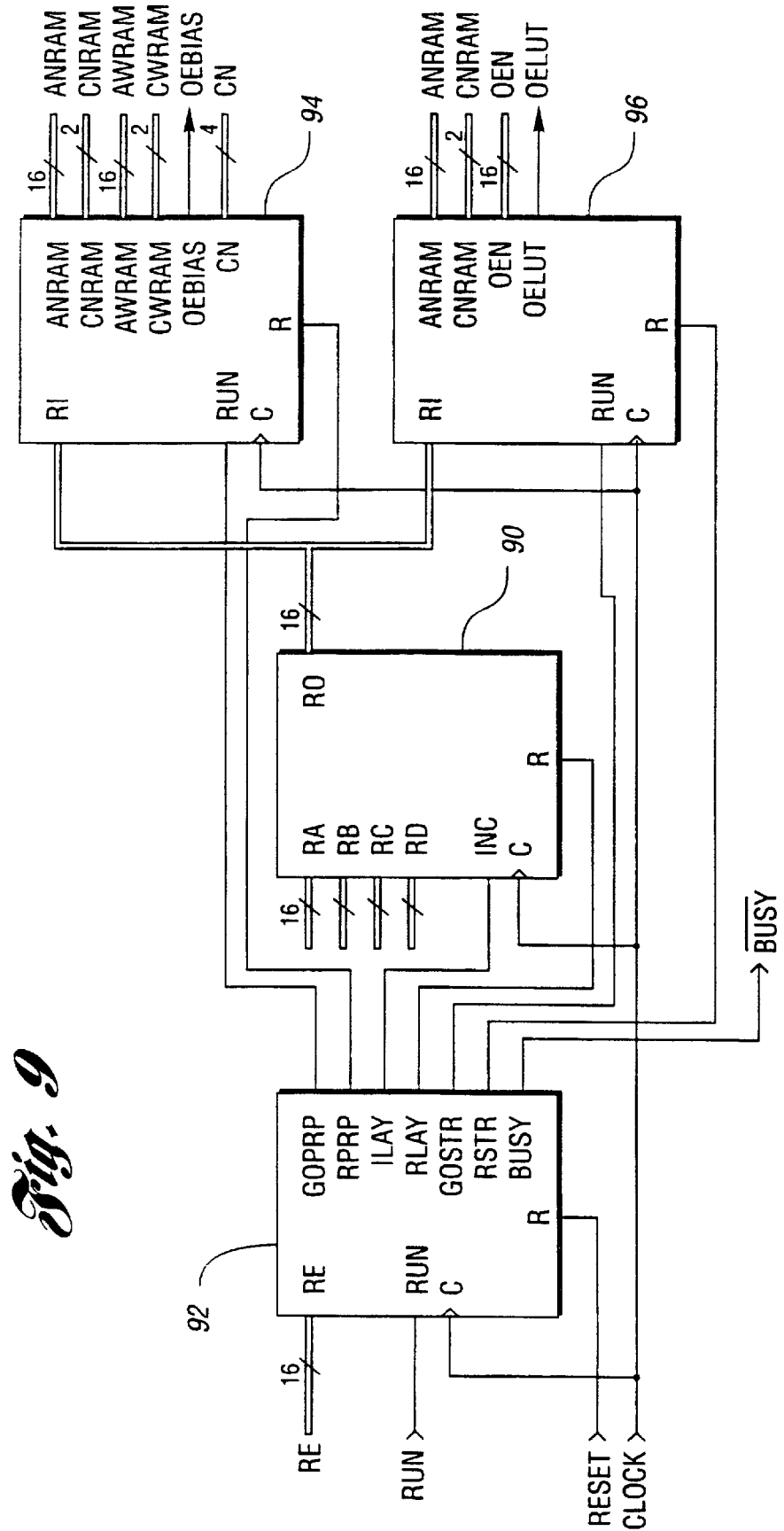
FIG. 9 is a block diagram of the run time controller of the global controller.

The run-time global controller 84 is shown in greater detail in FIG. 9. It is made up of four distinct logic blocks. They are: a current layer register selector 90; a finite state machine 92 in charge of sequencing high-level inter-layer operations; an intra-layer propagation controller 94; and an intra-layer specific neuron output data storage controller 96.

When the RUN command is issued to the run-time controller 84, state machine 92 begins execution by clearing the $\overline{BUSY}$ flag, the current layer register selector 90, the propagation controller 94, and the storage controller 96. The current layer controller has access to all four configuration registers, RA through RD. Upon reset, selector 90 points to the RA register (which defines the input layer topology) and thereby propagates its contents to the propagation and storage controllers, 94 and 96 respectively. The state machine 92 then passes control to the propagation controller 94 by toggling the RUN pin on controller 94 and goes into an idle mode. The role of the propagation controller 94 is to oversee the execution of the neuron multiply and accumulate operations. This is achieved by providing the necessary control logic and precise synchronization of data flow out of both the neuron RAM 76 and the synapse RAM 78 into the 16 element bank of bit-serial neurons. The propagation controller 94 therefore generates (1) the addresses ANRAM [5:0] and control signals CNRAM[2:0] to the neuron RAM 76; and (2) the addresses AWRAM[5:0] and control signals CWRAM to the synaptic weight RAM 78. The control signals that the propagation controller 94 also generates are the control lines CN[3:0] to the neuron block 70 which include commands to clear the multipliers and accumulators. The OEBIAS signal allows the propagation of a bias term, indicated at 80 in FIG. 7, to the neurons 70. The bias term is propagated on the data bus to the neurons, in much the same way as the neuron inputs from the neuron storage RAM 76. When the bias term is invoked, the neuron RAM outputs are simply tri-stated.

Upon completion of the propagation controller task, the linear activation for all neurons in the current layer have been calculated, as given by equation (1). The state machine 92 then passes execution to the storage controller 96 by toggling its RUN pin. The responsibility of the storage controller is to calculate the non-linear activations for the neurons, as per equation (1), linear activation of which was just calculated, and subsequently store the resulting quantities in RAM 76. This is achieved by sequentially enabling the linear output of each neuron on that layer, allowing the signal to propagate through the bipolar sigmoid activation look-up-table (LUT) 74, and storing the result in an appropriate memory location in RAM 76. Upon completion, the storage controller 96 returns control to the state machine 92. When active, the controller 92 generates the addresses ANRAM[5:0] and control signals CNRAM[2:0] to the neuron RAM 76, sequentially enables output of the active neurons via the OEN control lines, and enables access of the output from the LUT onto the neuron data input bus. When controller 92 completes execution, a full forward pass has been completed for a single layer of the recurrent neural network architecture. The state machine increments internal layer counters, and checks to see if there are any additional layers in the neural network topology that need to be calculated. If there are, the above process is repeated. If all layers have been computed and neuron outputs have been stored in RAM 76, the controller sets the $\overline{BUSY}$ flag, and returns to the idle mode. When the $\overline{BUSY}$ flag is high, data can be read from all RAM memory locations, and the results of the neurocomputation can be off-loaded to the external world. This completes the execution of the neurocomputation.

Figure 10:
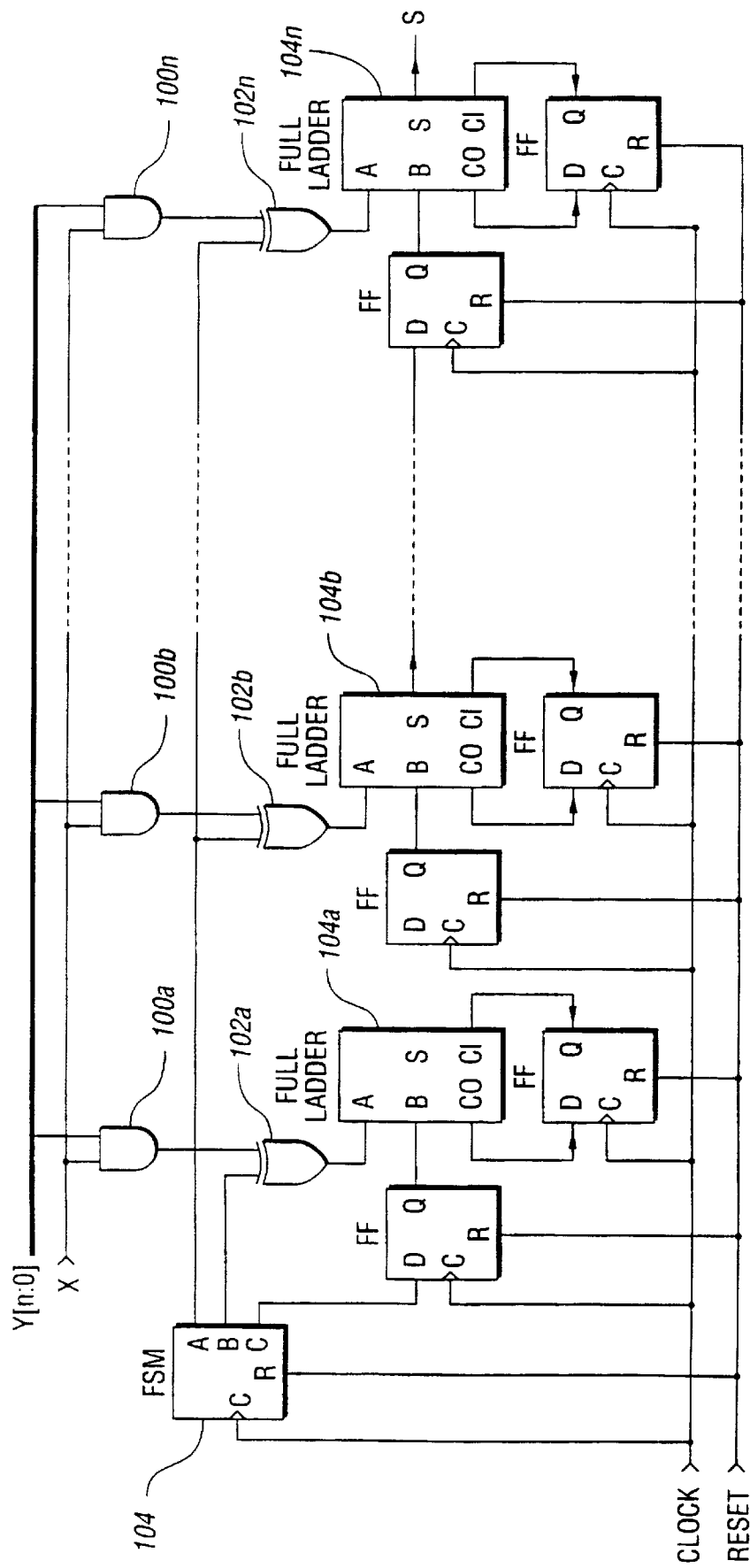
FIG. 10 is a schematic diagram of the multiplier of FIG. 5.

The multiplier 56 is shown in greater detail in FIG. 10. The multiplier 56 is used to perform the synaptic multiplications required by the neural network architecture. Applications constraints called for a 16×16-bit multiplier. In operation, the multiplier accepts as input either (1) an input stimulus to the neural network or (2) the activation output from a neuron on a previous layer. It multiplies this quantity by the corresponding synaptic weights. The input stimulus (for activation outputs) is presented to the multiplier in a fully parallel fashion while the synaptic weights are presented in a bit-serial fashion. The serial output of the multiplier feeds into the accumulator.

Any size multiplier can be formed by cascading the basic multiplier cell. The bit-wise multiplication of the multiplier and multiplicand is performed by the AND gates 100a–100n. At each clock cycle, the bank of AND gates therefore compute the partial product terms of a multiplier Y and the current multiplicand X(t). Two's complement multiplication is achieved by using XOR gates 102a–102n connected with the outputs of the AND gates and providing inputs to full adders 104a–104n. By controlling one of the inputs on the XOR gate, the finite state machine 106 can form the two's complement of selected terms based on its control flow. In general, for a n×n multiplier resulting in a 2n bit product, the multiplier can be formed using 2n basic cells and will perform the multiplication in 2n+2 clock cycles. Successive operations can be pipelined and the latency of the LSB of the product is n+2 cycles. In this implementation, n=16.

Figure 11:
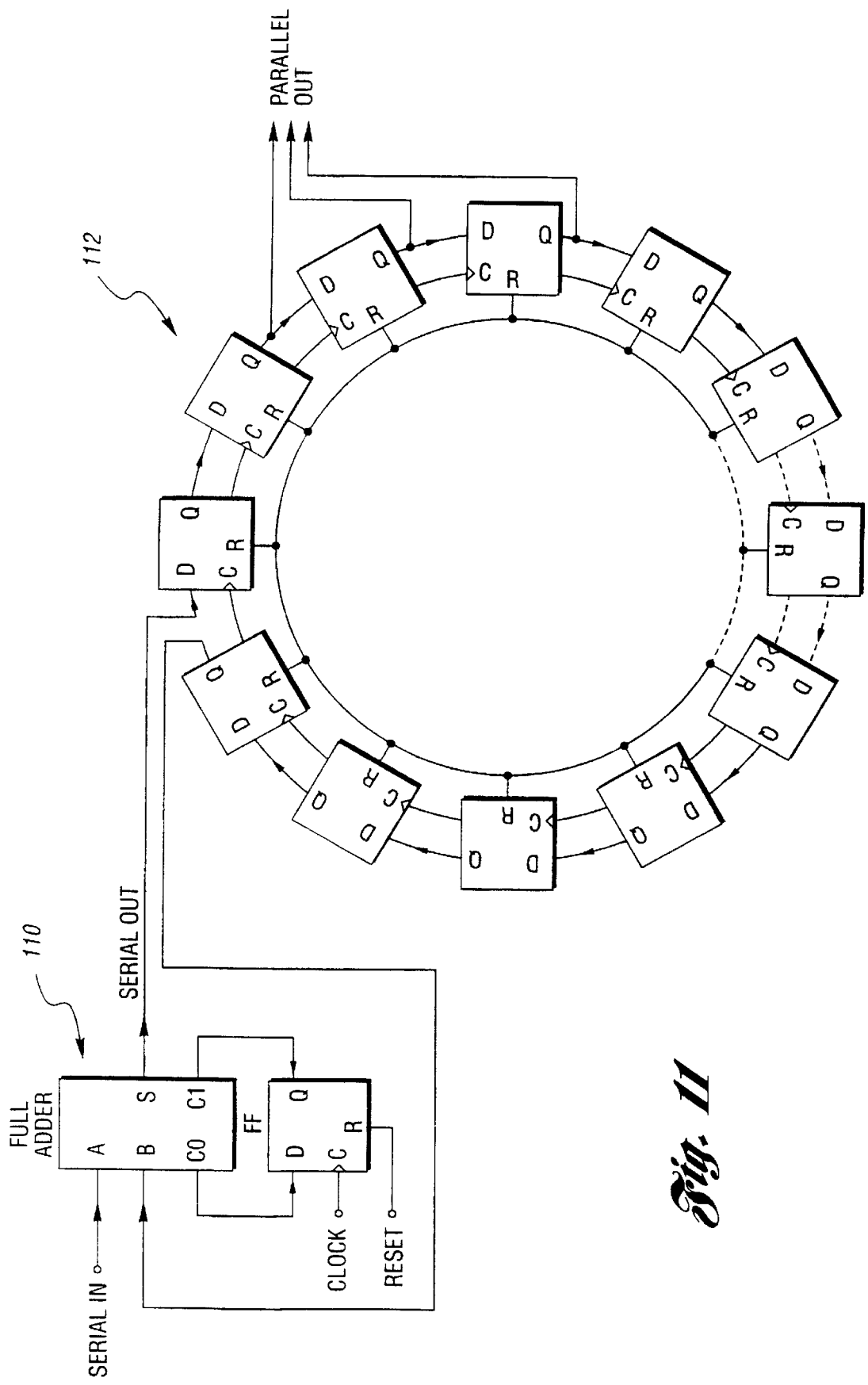
FIG. 11 is a schematic diagram of the accumulator of FIG. 5.

The accumulator 58 is shown in FIG. 11 and comprises a single bit-serial adder 110 linked to a chain of flip-flops generally indicated at 112. The bit-serial adder is made up of a single full adder and a flip-flop to store the carry bit. The length of the accumulator chain is controlled by the multiplication which takes 2n+2 clock cycles to perform a complete multiplication. At each clock cycle, the accumulator sums the bit from the input data stream with both the contents of the last flip-flop on the chain as well as the carry bit, if any, generated from the last addition operation a clock cycle before. This value is subsequently stored into the first element of the chain. This creates a circulating chain of data bits in the accumulator. In operation, the adder's flip-flop is reset prior to the accumulation of a sum.

While the best mode for carrying out the present invention has been described in detail, those familiar with the art to which this invention relates will recognize various alternative designs and embodiments for practicing the invention as defined by the following claims.

What is claimed is:

1. A system comprising:
   a neuroprocessor for implementing a reconfigurable network topology including a plurality of hidden layers containing neurons interconnected in a recurrent configuration;
   the neuroprocessor being responsive to an input pattern corresponding to processed real time engine operating conditions for determining whether a fault condition has occurred;
   the neuroprocessor comprising a neural module including a plurality of bit-serial neurons;
   a global controller for time multiplexing groups of neurons from the neural module to form first and second hidden layers of the network topology, the controller controlling application of the input pattern to the first hidden layer and controlling storage of the output of said first hidden layer for subsequent application as input to said second hidden layer.

2. The system defined in claim 1 configured to detect engine misfire, said input pattern includes a crankshaft acceleration input, an engine load input, an engine speed input and a cylinder identification input, the neuroprocessor producing an output indicating whether a misfire has occurred.

3. The system defined in claim 2 wherein each neuron comprises a bit-serial multiplier for multiplying first and second inputs, the controller sequentially applying to said first input of said multiplier one input of said input pattern or the activation output of a neuron on a previous layer, the controller applying a synaptic weight appropriate for said one input of said input pattern to said second input of said multiplier, each neuron further comprises a bit-serial accumulator for accumulating the output of said multiplier.

4. The system defined in claim 3 wherein the input bits are provided to the multiplier in parallel and the input synaptic weight bits are provided to the multiplier serially, the multiplier computing the product of the two inputs and making the results available to the accumulator on a bit-serial basis.

5. The system defined in claim 4 wherein the accumulator comprises a cyclical shift register with an adder at the input stage allowing the pipelining of outputs from the multiplier to be accumulated as the data is available from the multiplier.

6. The system defined in claim 5 wherein upon completion of all multiply and accumulate operations, a tri-state data latch stores the relevant accumulated sum until required by the controller.

7. The system defined in claim 6 wherein inputs are obtained from an engine controller.

8. An engine misfire detection system comprising:
   a neuroprocessor for implementing a reconfigurable network topology including a plurality of hidden layers containing neurons interconnected in a recurrent configuration;
   the neuroprocessor being responsive to an input pattern for determining whether a misfire has occurred, said input pattern corresponding to processed real time engine operating conditions;
   the neuroprocessor comprising a neural module including a plurality of bit-serial neurons;
   a global controller for time multiplexing groups of neurons from the neural module to form first and second hidden layers of the network topology, the controller controlling application of the input pattern to the first hidden layer and controlling storage of the output of said first hidden layer for subsequent application as input to said second hidden layer;
   said global controller comprising a configuration controller, and a run-time controller, the configuration controller including a plurality of configuration registers containing data that explicitly defines the topology of each layer of the recurrent neural network architecture.

9. The system defined in claim 8 wherein the configuration controller includes a data bus, an address bus, and receives a configuration control signal, a clock signal, and a reset signal, the address on the address bus internally selecting a configuration register as the destination of data on the data bus.

10. The system defined in claim 9 wherein the neuroprocessor further includes a neuron state RAM module for storing the contents of the output layer of the neural network.

11. The system defined in claim 10 wherein the neuron state RAM module is a single port RAM module.

12. The system defined in claim 9 wherein the run-time controller comprises a current layer register selector, a finite state machine for sequencing high-level inter-layer operations, an intra-layer propagation controller for controlling execution of neuronal multiply and accumulates, and an intra-layer specific neuron output data storage controller for controlling calculation of non-linear activations for the neurons whose linear state is given in accordance with the following equation:

$$x_j = \sum_i y_i w_{ij}$$

and for subsequently storing the resulting quantities in the neuron state RAM.

13. The system defined in claim 12 wherein the neuroprocessor further includes a sigmoid activation look-up-table for performing the non-linear activation function.

14. The system defined in claim 13 wherein said input pattern includes a crankshaft acceleration input, an engine load input, an engine speed input, a cylinder identification input, and a bias input.

15. The system defined in claim 14 wherein each neuron comprises a bit-serial multiplier for multiplying first and second inputs, the controller sequentially applying one input of said input pattern or the activation output of a neuron on a previous layer to said first input of said multiplier, the controller applying a synaptic weight appropriate for the input to said second input of said multiplier, each neuron further comprises a bit-serial accumulator for accumulating the output of said multiplier.

16. The system defined in claim 15 wherein the input bits are provided to the multiplier in parallel and the input synaptic weight bits are provided to the multiplier serially, the multiplier computing the product of the two inputs and making the results available to the accumulator on a bit-serial basis.

17. The system defined in claim 16 wherein the accumulator comprises a cyclical shift register with an adder at the input stage allowing the pipelining of outputs from the multiplier to be accumulated as the data is available from the multiplier.

18. The system defined in claim 17 wherein upon completion of all multiply accumulates, a tri-state data latch stores the relevant accumulated sum until required by the controller.

19. The system defined in claim 18 wherein certain ones of the inputs in said pattern are sensor data processed by an engine controller prior to input to said neuroprocessor.

20. An engine misfire detection system comprising:

a neuroprocessor for implementing a reconfigurable network topology including a plurality of hidden layers containing neurons interconnected in a recurrent configuration;

said neuroprocessor being responsive to an input pattern for determining whether a misfire has occurred, said input pattern corresponding to processed real time engine operating conditions;

said neuroprocessor comprising a neural module including a plurality of bit-serial neurons;

a global controller for time multiplexing groups of neurons from the neural module to form first and second hidden layers of the network topology, the controller controlling application of the input pattern to the first hidden layer and controlling storage of the output of said first hidden layer for subsequent application as input to said second hidden layer;

said global controller comprising a configuration controller, and a run-time controller, the configuration controller including a plurality of configuration registers containing data that explicitly defines the topology of each layer of the recurrent neural network architecture;

said global controller including a run-time controller for initiating a neurocomputation using the data in said configuration registers, and a neuron state RAM module for storing the contents of the output layer of the neural network;

said run-time controller comprising a current layer register selector, a finite state machine for sequencing high-level inter-layer operations, an intra-layer propagation controller for controlling execution of neuronal multiply and accumulates, a sigmoid activation look-up-table for performing a non-linear activation function and an intra-layer specific neuron output data storage controller for controlling calculation of non-linear activations for the neurons and for subsequently storing the resulting quantities in said neuron state RAM, said input pattern including a crankshaft acceleration input, an engine load input, an engine speed input, a cylinder identification input, and a bias input.

* * * * *